US012445797B2

(12) United States Patent
Nguyen et al.

(10) Patent No.: US 12,445,797 B2
(45) Date of Patent: Oct. 14, 2025

(54) SCALABLE BINAURAL AUDIO STREAM GENERATION

(71) Applicant: DOLBY LABORATORIES LICENSING CORPORATION, San Francisco, CA (US)

(72) Inventors: Khoa-Van Nguyen, Begles (FR); Stephane Giraudie, Sausalito, CA (US); Benoit Senard, Le Bouscat (FR)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 69 days.

(21) Appl. No.: 17/688,554

(22) Filed: Mar. 7, 2022

(65) Prior Publication Data

US 2022/0191639 A1 Jun. 16, 2022

Related U.S. Application Data

(63) Continuation of application No. 16/554,904, filed on Aug. 29, 2019, now Pat. No. 11,272,310.

(Continued)

(51) Int. Cl.
*H04S 7/00* (2006.01)
*H04R 3/04* (2006.01)

(Continued)

(52) U.S. Cl.
CPC .............. *H04S 7/304* (2013.01); *H04R 3/04* (2013.01); *H04R 5/033* (2013.01); *H04R 5/04* (2013.01);

(Continued)

(58) Field of Classification Search
CPC .. H04S 7/304; H04S 2400/11; H04S 2400/13; H04R 3/04; H04R 5/033; H04R 5/04
See application file for complete search history.

(56) References Cited

U.S. PATENT DOCUMENTS 6,766,028 B1 * 7/2004 Dickens .................. H04S 3/004 381/74
2005/0117762 A1 6/2005 Sakurai
(Continued)

FOREIGN PATENT DOCUMENTS

EP 2946571 B1 4/2018
WO 2014111765 A1 7/2014

*Primary Examiner* — Daniel R Sellers

(57) ABSTRACT

Described is a method performed by a computation device for generating a binaural audio stream, comprising: receiving an audio stream for a sound source; determining a measure of processing capability of the computation device; selecting, based on the determined measure, a filtering mode from among a predefined set of filtering modes for use in an audio filtering process intended to convert the audio stream into a binaural audio stream; determining, based on a relative position of the virtual source location to a virtual listener location in a virtual listening environment, filter parameters for a set of filters specified by the selected filtering mode; generating the binaural audio stream by applying the audio filtering process to the audio stream, using the set of filters specified by the selected filtering mode; and outputting the binaural audio stream for playback. Further described are corresponding computation devices, computer programs, and computer-readable storage media.

21 Claims, 9 Drawing Sheets

Related U.S. Application Data

(60) Provisional application No. 62/724,577, filed on Aug. 29, 2018.

(51) Int. Cl.
*H04R 5/033* (2006.01)
*H04R 5/04* (2006.01)

(52) U.S. Cl.
CPC ....... *H04S 2400/11* (2013.01); *H04S 2400/13* (2013.01)

(56) References Cited

U.S. PATENT DOCUMENTS

| | | | | |
|---|---|---|---|---|
| 2008/0298610 | A1* | 12/2008 | Virolainen | H04S 7/302 381/300 |
| 2012/0022842 | A1* | 1/2012 | Amadu | H04S 7/30 703/6 |
| 2014/0355794 | A1 | 12/2014 | Morrell | |
| 2015/0131824 | A1* | 5/2015 | Nguyen | H04S 7/307 381/300 |
| 2015/0358754 | A1* | 12/2015 | Koppens | H04S 7/30 381/17 |
| 2016/0134987 | A1* | 5/2016 | Gorzel | H04S 7/304 381/310 |
| 2016/0227338 | A1* | 8/2016 | Oh | H04S 7/303 |
| 2016/0345116 | A1 | 11/2016 | Yen | |
| 2017/0019746 | A1* | 1/2017 | Oh | H04S 3/008 |
| 2017/0105083 | A1 | 4/2017 | Nair | |
| 2018/0091918 | A1 | 3/2018 | Lee | |
| 2021/0168548 | A1* | 6/2021 | Honma | H04S 3/008 |

* cited by examiner

SCALABLE BINAURAL AUDIO STREAM GENERATION

CROSS-REFERENCE TO RELATED APPLICATIONS

This application is a continuation of U.S. patent application Ser. No. 16/554,904 filed Aug. 29, 2019, which claims priority to U.S. Provisional Patent Application No. 62/724,577, filed Aug. 29, 2018, which is hereby incorporated by reference in its entirety.

TECHNICAL FIELD

The disclosure relates to the field of audio processing. In particular, the disclosure relates to techniques for generating a binaural audio stream.

BACKGROUND

A problem with audio processing is generating a high-quality binaural audio stream using a limited number of processing resources. Often, binaural audio stream generators apply a large fixed set of filters to an audio stream to generate a binaural audio stream. Applying the fixed set of filters is computationally expensive and may not be achievable by all computational devices (computation devices) that have limited processing resources. Accordingly, a method to determine the available processing power of a client device and generate a binaural audio stream from the available resources would be beneficial.

SUMMARY

In view of the above, the present disclosure provides a method performed by a computation device for generating a binaural audio stream, a computation device, a program, and a computer-readable storage medium, having the features of the respective independent claims.

According to an aspect of the disclosure, a method for generating a binaural audio stream is provided. The method may be performed by a computation device. The computation device may be a client device of a listener, such as a smartphone, a tablet, a PDA, or a desktop PC, for example. The method may include assigning a sound source to a virtual source location within a virtual listening environment. The sound source may be a talker (presenter, speaker) in a teleconferencing application, for example. The virtual source location may have a relative position to a virtual listener location in the virtual listening environment. In some implementations, the virtual source location may be determined based on a number (count) of sources that are to be rendered, or a predetermined set of source locations in the virtual listening environment, etc. The method may further include receiving an audio stream for the sound source. The method may further include determining a measure of processing capability (e.g., available processing power, available resources, available CPU power) of the computation device. The method may further include selecting, based on the determined measure of processing capability, a filtering mode from among a predefined set of filtering modes (digital signal processing techniques) for use in an audio filtering process. The audio filtering process may be intended to convert the audio stream into a binaural audio stream. Each filtering mode may specify a respective set of filters. The set of filters for each filtering mode may include two filters, one relating to (an impulse response of) a propagation path from the virtual source location to a left ear of a virtual listener at the virtual listener location and one relating to (an impulse response of) a propagation path from the virtual source location to a right ear of the virtual listener. The filters may implement HRTFs, for example. The method may further include determining, based on the relative position of the virtual source location to the virtual listener location, filter parameters for the set of filters specified by the selected filtering mode. The method may further include generating the binaural audio stream by applying the audio filtering process to the audio stream, using the set of filters specified by the selected filtering mode and the determined filter parameters for the set of filters. The binaural audio stream may be intended to allow a listener at the virtual listener location to perceive sound from the sound source as emanating from the virtual source location. The method may yet further include outputting the binaural audio stream for playback. Playback may be performed by a playback device, for example. The playback device may include a pair of headphone loudspeakers, for example.

Generating binaural audio streams from source audio streams can considerably improve the perceived user experience for headphone use cases including, but not limited to teleconferencing applications. Configured as described above, the proposed method can monitor the processing capability of the computation device that is to perform the binaural filtering, and adjust the binaural filtering in accordance with the available processing capability. This ensures that the best possible sound quality is presented to the user, while also taking care that the computation device is not overburdened with the binaural audio filtering.

In some embodiments, the generated binaural audio stream may be intended for playback through the left and right loudspeakers of a headset (pair of headphone loudspeakers). Accordingly, in some implementations the method may include rendering the generated binaural audio stream to the left and right loudspeakers of the headset.

In some embodiments, determining the measure of processing capability of the computation device may be repeatedly performed to thereby monitor the processing capability of the computation device. This allows to repeatedly and dynamically determine an appropriate filtering mode for generating the binaural audio stream based on the real-time measure of the processing capability of the computation device.

In some embodiments, determining the measure of processing capability of the computation device includes at least one of: determining a processor load for a processor of the computation device, determining a number of processes running on the computation device, determining an amount of free memory of the computation device, determining an operating system of the computation device, and determining a set of device characteristics of the computation device. Thereby, the processing capability of the computation device can be determined in a simple and efficient manner.

In some embodiments, selecting the filtering mode from among the predefined set of filtering modes may include ranking the filtering modes in the predefined set of filtering modes based on one or more criteria. Said selecting may further include determining, based on the determined measure of processing capability, those filtering modes that the computation device can implement in the audio filtering process. Said selecting may yet further include selecting the filtering mode that is highest ranked among those filtering modes that the computation device can implement in the audio filtering process.

In some embodiments, the one or more criteria may include at least one of: an indication of an error between an ideal binaural audio stream and a binaural audio stream that would result from applying the audio filtering process using the set of filters specified by the filtering mode, a frequency band in which the set of filters specified by the filtering mode is effective, a gain level of the set of filters specified by the filtering mode, and a resonance level of the set of filters specified by the filtering mode. Considering such criteria allows to find the appropriate filtering mode, given the processing capability of the computation device and a desired level of, for example, sound quality.

In some embodiments, the predefined set of filtering modes may include at least one filtering mode specifying a set of filters for filtering the audio stream in the frequency domain and at least one filtering mode specifying a set of filters for filtering the audio stream in the time domain. Since not all computation devices are capable of applying FFTs to the audio stream, the proposed method allows to select time-domain filters in that case.

In some embodiments, the predefined set of filtering modes may include at least one time-domain cascaded filtering mode specifying a set of cascaded time-domain filters. Using a cascade of (preferably short) time domain filters allows to implement the filtering in an efficient and scalable manner for computation devices that are not capable of frequency-domain filtering.

In some embodiments, the predefined set of filtering modes may include a plurality of time-domain cascaded filtering modes that respectively specify sets of cascaded time-domain filters with associated numbers of time-domain filters in respective cascades. Then, selecting the filtering mode from among the predefined set of filtering modes may include selecting a time-domain cascaded filtering mode from among the plurality of time-domain cascaded filtering modes based on the determined measure of processing capability. Said selecting the filtering mode may further include, for the selected time-domain cascaded filtering mode, selecting time-domain filters from a predefined set of time-domain filters, up to the number of time-domain filters associated with the selected filtering mode and constructing cascaded time-domain filters for the audio filtering process using the selected time-domain filters. Thereby, the impact and computational cost of the cascaded time-domain filtering can be scaled in accordance with the available resources of the computation device.

In some embodiments, the predefined set of filtering modes may include at least one spherical harmonics filtering mode specifying a set of filters that are modeled based on a set of spherical harmonics.

In some embodiments, the predefined set of filtering modes may include a plurality of spherical harmonics filtering modes that respectively specify filters that are modeled based on a set of spherical harmonics up to respective orders of spherical harmonics. Then, selecting the filtering mode from among the predefined set of filtering modes may include selecting, based on the determined measure of processing capability, that spherical harmonics filtering mode from among the plurality of spherical harmonics filtering modes that has the highest order of spherical harmonics that can still be implemented by the computational device. This provides for another option for scalably implementing the binaural audio filtering.

In some embodiments, the predefined set of filtering modes may include at least one virtual panning filtering mode specifying filters for binaurally rendering panned audio streams resulting from virtual panning of the audio stream to respective virtual loudspeakers at virtual loudspeaker locations to the virtual listener location. That is, the filtering mode may specify two HRTFs for each virtual loudspeaker location. This filtering mode has the advantage that the required computational capacity does not scale with the number of sound sources. If plural sound sources are present, the method may receive a plurality of audio streams for respective sound sources.

In some embodiments, the method may further include implementing virtual movement of the sound source by adjusting the virtual panning of the audio stream to the virtual loudspeakers. Since the filter parameters depend only on the relative position of the virtual loudspeaker locations and the virtual listener location, the virtual movement of the sound source can be implemented at low computational cost.

In some embodiments, the parameters for the set of filters specified by the selected filtering mode may control at least one of gain, frequency, timbre, spatial accuracy, and resonance when generating the binaural audio stream.

In some embodiments, the predefined set of filtering modes may be stored at a storage location of the computation device. Then, the method may further include accessing a network system to update the predefined set of filtering modes stored in the storage location of the computation device.

In some embodiments, the computation device may be part of a client device or implemented by the client device.

According to another aspect, a computation device is provided. The computation device may include a processor configured to perform any of the methods described throughout the disclosure.

According to another aspect, a computer program is provided. The computer program may include instruction that, when executed by a computation device, cause the computation device to perform any of the methods described throughout the disclosure.

According to yet another aspect, a computer-readable storage medium is provided. The computer-readable storage medium may store the aforementioned computer program.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Listening Environments

Figure 1A:
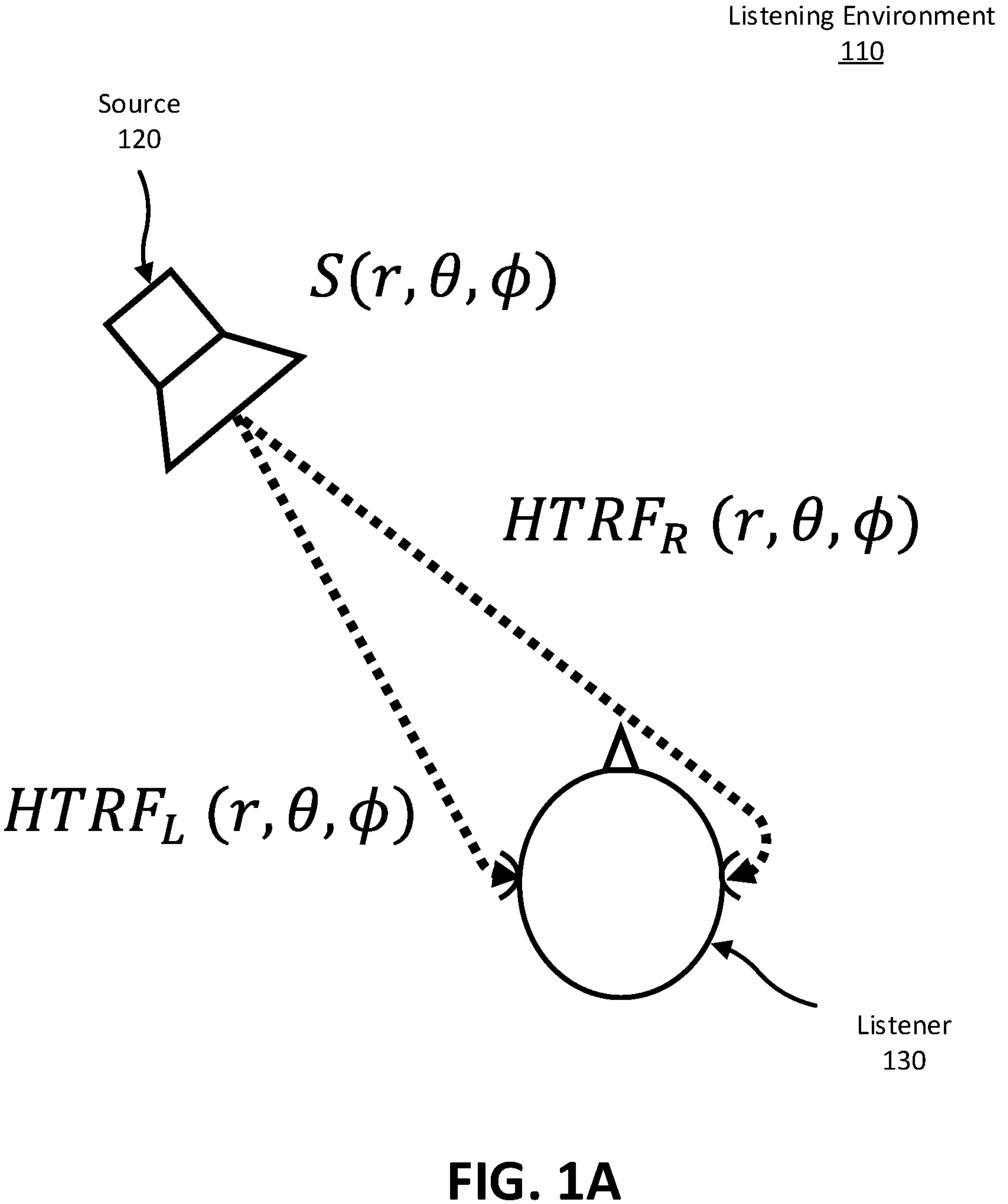
FIG. 1A is an illustration of a listening environment including a source at a source location and a listener at a listener location.

FIG. 1A shows an example a real-world listening environment. In this example, a sound source or source (S) 120 generates a sound (or sound field) and a listener perceives the generated sound. The sound generated by the sound source 120 may relate to an audio stream (source audio stream) for the sound source 120 that is representative of the sound generated by the sound source 120. The sound (or sound field) at the location of the listener 130 is a function of the orientation (relative position) between the source 120 and the listener 130. That is, the way the listener 130 perceives the sound is a function of the distance r, azimuth θ, and inclination φ of the audio source 120 relative to the listener 130. More specifically, the listener 130 perceives the sound differently for his left ear and his right ear. For example, if a source 120 generates a sound on the left side of the head of a listener 130, the left ear of the listener 130 will perceive a different sound than his right ear. This allows the listener 130 to perceive the source at the source's 120 location.

Accordingly, a sound generated by source 120 can be modeled as two different sound components: one for the left ear and one for the right ear. Here, the two different sound components are the original sound filtered by a head-related transfer function (HRTF) for the left ear and a HRTF for the right ear of the listener 130, respectively. In terms of audio streams, audio streams for the left and right ears would be HRTF-filtered versions of an original audio stream for the sound source. A HRTF is a response that characterizes how an ear receives a sound from a point in space and, more specifically, models the acoustic path from the source 120 at a specific location to the ears of a listener 130. Accordingly, a pair of HRTFs for two ears can be used to synthesize a binaural audio stream that is perceived to originate from the particular location in space of the source 120.

Figure 1B:
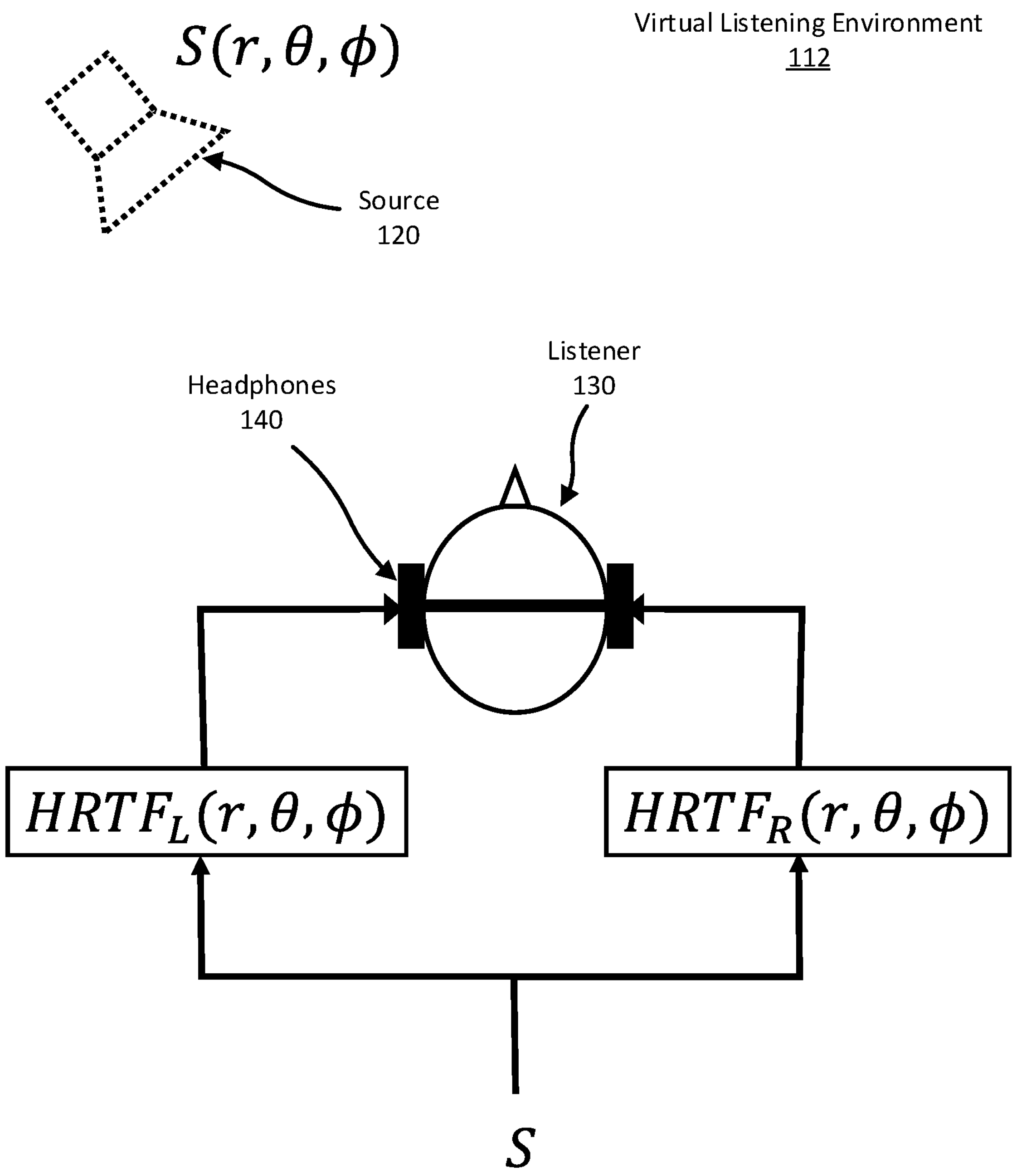
FIG. 1B is an illustration of a listening environment virtually reproducing a source at a source location for a listener at a listener location.

Embodiments of the disclosure relate to generating binaural audio streams from source audio streams in virtual listening environments. FIG. 1B shows an example of such virtual listening environment. In this example, the virtual listening environment is recreating the sound generated by a source 120 for a listener 130 wearing a pair of headphones 140. The source 120 is arranged at (or assigned to) a virtual source location in the virtual listening environment and the listener 130 is arranged at a virtual listener location in the virtual listening environment. The virtual source location has a relative position (or relative orientation, relative displacement, offset) with respect to the virtual listener location. In an example where the virtual listening environment does not include HRTFs to generate a binaural audio stream from the source audio stream, the user cannot perceive a location of the source 120. That is, the user perceives the source as originating between his ears. However, as illustrated, the virtual listening environment includes an audio filter that generates a binaural audio stream using HRTFs. The generated binaural audio stream allows the listener 130 to perceive the generated audio stream as if it originated from the source at the source location.

System Environment

Figure 2:
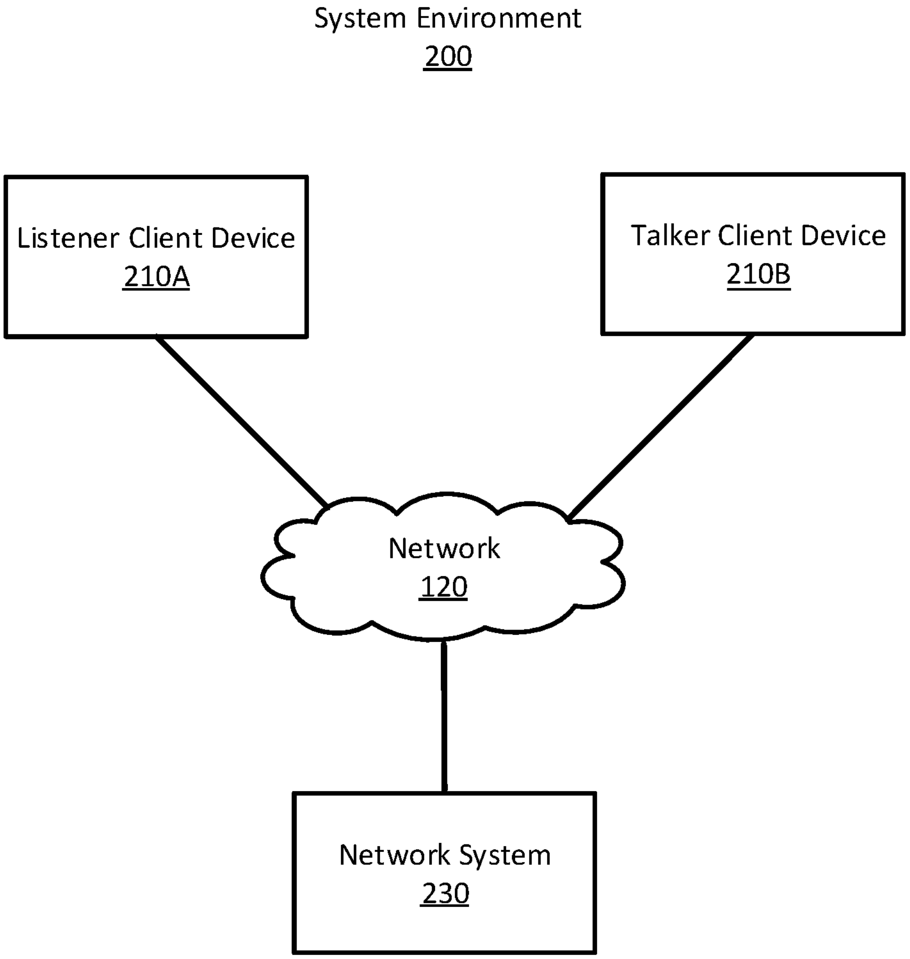
FIG. 2 is a diagram of a system environment for dynamically generating a listening environment that reproduces a source at a location for a listener at a listener location.

FIG. 2 shows an example system environment for generating a binaural audio stream using a computation device, according to some embodiments. The computation device may correspond to, implement, comprise, or be comprised by, an audio processing module. In the example of FIG. 2, the system environment includes a listener client device 210A, a talker client device 210B, a network 120, and a network system 230. The listener client device 210A is operated by a user (e.g., a listener 130) and the talker client device 210B is operated by a different user (e.g., a talker (or any other audio source)). The talker may also be referred to as a presenter or speaker in a virtual listening session. The talker (or speaker) is a non-limiting example of a sound source generating an audio stream. While this disclosure may make frequent reference to a talker, it is understood that the scope of the disclosure also covers (generic) sound sources in place of the talkers.

Within the network 120, the listener and the talker may connect to a listening session via a network 120. The listening session is hosted by a device (e.g., a hosting device) within the environment. Both the talker and the listener are assigned a virtual location within the listening session.

The hosting device may be either the network system 230 or the listener client device 210A. The hosting device is the device that generates a binaural audio stream by applying appropriate audio filters (e.g., HRTF filters). For example, if a network system 230 is the hosting device, the talker client device 210B may transmit an audio stream to the network system 230 via the network 120. The network system 130 generates the binaural audio stream from the received audio stream and transmits the binaural audio stream to the listener client device 210A. In another example, the listener client device 210 is the hosting device. Here, the talker client device 210B transmits an audio stream to the listener client device 210A via the network 120 and the listener client device 210A generates the binaural audio stream. The hosting device may comprise or otherwise implement the aforementioned audio processing module (e.g., computation device).

The talker client device 210B generates an audio stream by recording the speech of the talker. Other methods of generating the audio stream are feasible and should be understood to be within the scope of this disclosure. The audio stream is transmitted to the hosting device via the network 120. The hosting device generates a binaural audio stream from the audio stream using an audio filtering process. The audio filtering process may involve applying a binaural audio filter. The binaural audio filter can include any number of audio filters with an increasing number of filters improving the quality of the binaural audio filter. The number of audio filters to apply is selected based on a computational resource availability of the hosting device. The binaural audio filters are also selected based on the virtual locations of the talker and the listener within the listening session. The hosting device provides the binaural audio stream to the listener client device. The binaural audio stream is a representation of the received audio stream. In particular, the binaural audio stream allows the listener to perceive the talker at a real-world location that corresponds to the virtual location of the talker in the listening session.

In general, the computation device (or audio processing module) receives an audio stream from the sound source and generates a binaural audio stream from the received audio stream by means of an audio filtering process. Typically, the binaural audio stream is intended for playback through left and right loudspeakers of a headset. The audio filtering process may select and use one among a predefined set of filtering modes that may have different characteristics (e.g., targeted frequency bands, gains, resonance levels, effects, etc.) and system requirements (e.g., required processing power), for example. The filtering modes represent different digital signal processing (DSP) techniques for binaural filtering of the audio stream. These DSP techniques may be scalable. Each filtering mode may specify a respective set of filters (e.g., HRTF filters). For example, each filtering mode may specify a pair of HRTF filters, one for the (virtual) listeners left ear and one for the (virtual) listener's right ear. If a filtering mode involves spatial audio panning, it may specify a pair of HRTF filters for each of a plurality of virtual loudspeaker locations. Each of these filters may be characterized by a filtering function with a plurality of filtering parameters. The filter parameters themselves may not yet be specified. The actual filter parameters may depend on the virtual orientation (relative position) between the virtual source location (virtual talker location) and the virtual listener location.

Figure 3A:
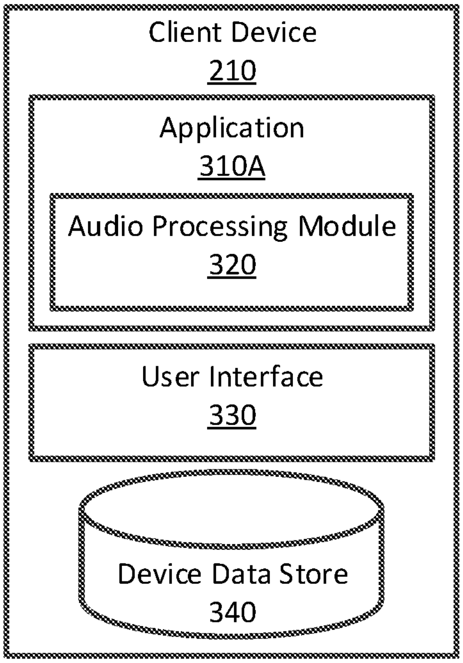
FIGS. 3A-3B are diagrams of client devices in the system environment.
Figure 3B:
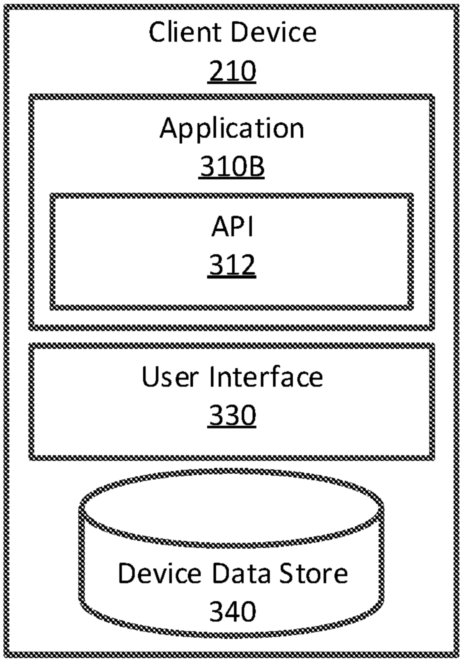

FIG. 3A and FIG. 3B illustrate example client devices that can participate in a listening session. Each client device 210 is a computer or other electronic device used by one or more users to perform activities including recording and/or capturing audio, playing back audio, and participating in a listening session. The client devices may be a listener client device 210A or a listener client device 210B. The client device 210, for example, can be a personal computer executing a web browser or dedicated software application that allows the user to participate in listening sessions with other client devices and the network system. In other embodiments, the client device is a network-capable device other than a computer, such as a mobile phone (or smartphone), personal digital assistant (PDA), a tablet, a laptop computer, a wearable device, a networked television or "smart TV," etc.

The client devices include software applications, such as application 310A, 310B (generally 310), which execute on the processor of the respective client device. The applications may communicate with one another and with network system (e.g. during a listening session). The application 310 executing on the client device 210 additionally performs various functions for participating in a listening session. Examples of such applications can be a web browser, a virtual meeting application, a messaging application, a gaming application, etc.

An application, as in FIG. 3A, may include an audio processing module 320. The audio processing module 320 can initiate a listening session. Any number of client devices 210 can connect to the listening session via the network. Because the audio processing module 320 can be located on a client device 210 or a network system 230, the listening session can be hosted on either a client device 210 or a network system 230 (e.g., the hosting device).

Generally, a user initiating the listening session is a listener operating a listener client device and users connecting to the listening session are talkers operating talker client devices 210. To avoid confusion, within the listening session, a listener is a virtual listener and a talker is a virtual talker. However, more precisely, within a listening session every user connected to a listening session is a virtual talker and a virtual listener. That is, a listener for one client device in the session is a talker for another client device in the listening session and vice versa.

The audio processing module 320 generates a virtual listening environment for the listening session. The virtual listening environment acts as a virtual analog to a real world listening environment. For example, the virtual environment can be a set of virtual locations (e.g., chairs) around a virtual conference table. The audio processing system 320 assigns the virtual listener and the virtual talkers to virtual locations (e.g., a virtual source location and a virtual listener location) within the virtual environment. Continuing the example, each virtual talker and virtual listener is assigned a virtual location around the virtual conference table.

Figure 4:
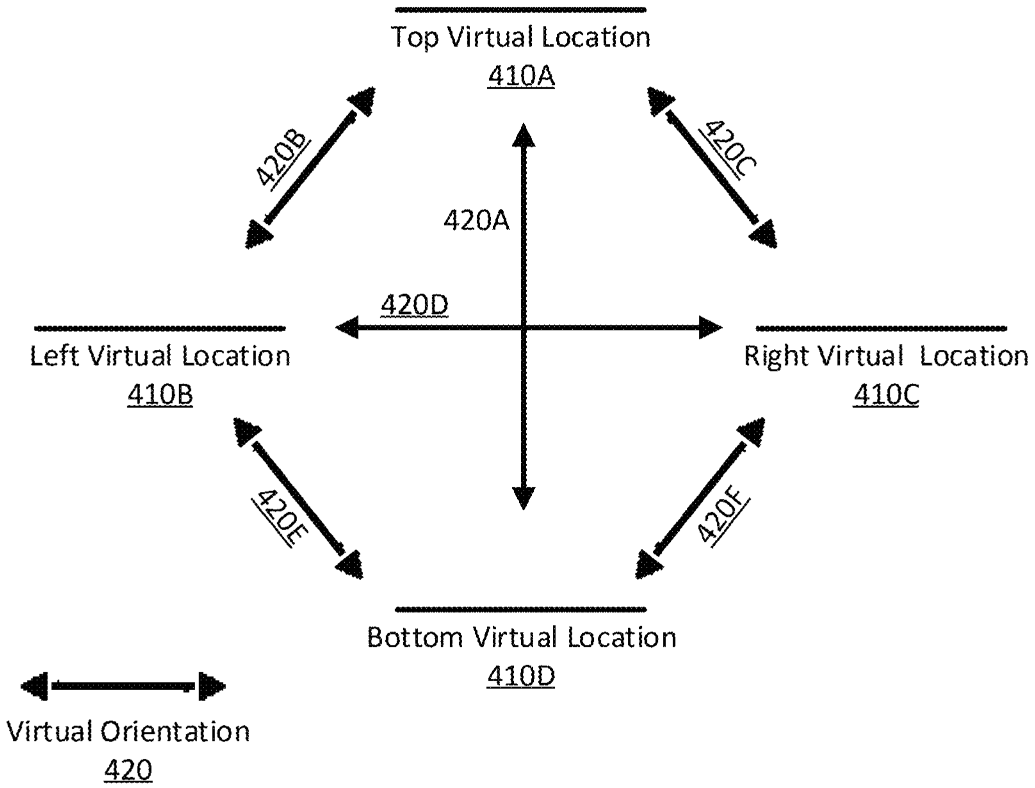
FIG. 4 is an illustration of virtual orientations between virtual locations.

Each combination (i.e., pair) of virtual locations has an associated virtual orientation (or relative position). A virtual orientation (relative position) is the position of a virtual location relative to the position of another virtual location in the virtual environment. Take, for example as in FIG. 4, a virtual environment including four virtual locations arranged along the four sides of a square (e.g., the top 410A, bottom 410D, left 410B, and right 410C virtual locations 410). In this example, there are six virtual orientations 420: top-bottom 420A, top-left 420B, top-right 420C, left-right 420D, bottom-left 420E, and bottom-right 420, where x-y indicates the virtual orientation 420 between the x and y virtual locations 410. Each virtual orientation 420 can include information about the distance r, azimuth, and elevation between virtual locations. Each virtual orientation 420 is associated with a number (e.g., pair) of binaural audio filters to generate a binaural audio stream for a listener from a talker, e.g., 130, for a given virtual orientation.

Returning to FIG. 3A, the audio processing module 320 (e.g., computation device) can determine a resource availability (e.g., measure of processing capability) of the computation device implementing the audio processing module (e.g., a client device 210 or a network system 230). The resource availability is a measure of a processors available processing power. There can be any number of measures of a processors available processing power. Determining the resource availability can include sending a resource query to a processor and receiving a resource availability in response. Further, determining the measure of processing capability of the computation device can include any of: determining a processor load for a processor of the computation device, determining a number of processes running on the computation device, determining an amount of free memory of the computation device, determining an operating system of the computation device, and determining a set of device characteristics of the computation device. It is to be noted that the measure of processing capability can be performed repeatedly (e.g., periodically), to thereby monitor the processing capability of the computation device, for example in real time.

Additionally, the audio processing module 320 generates a binaural audio stream from a received audio stream using audio filters. In one example, the audio processing module 320 on a listener client device 210A receives an audio stream (e.g., from a talker client device 210B), and applies an audio filtering process to generate a binaural audio stream.

Generally, two binaural audio filters (HRTF left and HRTF right) are applied to a source audio stream to generate a binaural audio stream. Here, each binaural audio filter can be decomposed into several audio filters that, in aggregate, function similarly to a binaural audio filter. Each audio filter may include a number of parameters that when applied to the received audio stream generate a binaural audio stream. Any number of audio filters can be applied to an audio stream and the greater the number of audio filters applied, the better the generated binaural audio stream (e.g., more accurate). In some cases, each audio filter can be associated with a characteristic of the generated binaural audio stream (e.g., gain.).

In general, an array (bench) of different filtering modes (or DSP techniques) for use in the audio filtering process can be provided. Examples of filtering modes will be described below. Each filtering mode specifies a respective set of filters (e.g., a pair of HRTF filters) for generating a binaural audio stream from an input audio stream. When performing the audio filtering process, the audio processing module can select an appropriate one among the predefined filtering modes and use the filters specified by that filtering mode for generating the binaural audio stream. This selection may be made based on the determined measure of processing capability. In particular, this selection may be performed dynamically, assuming that the processing capability of the computation device is repeatedly or periodically determined (i.e., monitored). Thereby, the filtering mode/DSP technique can be matched to the processing capability of the computation device, and an optimum result at the available processing capability can be ensured. Once the filtering mode (and thus, the filters specified by this filtering mode) have been selected, the actual filter parameters for use in the filters specified by that filtering mode may be determined based on the virtual orientation (relative position) of the virtual source location to the virtual listener location.

In one specific example, in one filtering mode, binaural audio filters are decomposed into parametric infinite impulse response filters. However, in other embodiments, other audio filters may be used to approximate a binaural audio filter. Various audio filters and their characteristics are described below.

The audio processing module selects a filtering mode (e.g., a number of audio filters) to apply to the audio stream based on the determined resource availability. For example, if there is a first amount of resource availability, the audio processing module applies a number of audio filters that uses less than the first amount of resource availability to implement.

In some cases, rather than an application including the audio processing module 320 the application 310 can access a network system 230 including an audio processing module 320. For example, FIG. 3B illustrates a client device executing an application including an application programming interface (API) to communicate with the network system through the network. The API can expose the application to an audio processing module on the network system. The accessed audio processing module can provide any of its functionality described herein to the client device. In some examples, the API is configured to allow the application to participate in a listening session as a listener or a talker.

A client device may include a user interface. The user interface includes an input device or mechanism (e.g., a hardware and/or software button, keypad, microphone) for data entry and output device or mechanism for data output (e.g., a port, headphone port/socket, display, loudspeaker). The output devices can output data provided by a client device or a network system. For example, a listener using a listener client device can play back a binaural audio stream using the user interface. In this case, the listener client device may include a headset (a pair of headphone loudspeakers). The input devices enable the user to take an action (e.g., an input) to interact with the application or network system via a user interface. These actions can include: typing, speaking, recording, tapping, clicking, swiping, or any other input interaction. For example, a talker using a talker client device can record her speech as an audio stream using the user interface. In some examples, the user interface includes a display that allows a user to interact with the client devices during a listening session. The user interface can process inputs that can affect the listening session in a variety of ways, such as: displaying audio filters on the user interface, displaying virtual locations on a user interface, receiving virtual location assignments, or any of the other interactions, processes, or events described within the environment during a listening session.

The device data store contains information to facilitate listening sessions. In one example, the information includes a ranked list of the filtering modes. In this list, the filtering modes may be ranked based on one or more criteria. This ranking may be performed by the audio processing module. In some implementations, this ranking may be updated in accordance with a user (listener) input, for example indicating the user's preference for certain filtering modes or certain types of audio processing. The one or more criteria for ranking the filtering modes may include any of: an indication of an error between an ideal binaural audio stream and a binaural audio stream that would result from applying the audio filtering process using the set of filters specified by the filtering mode, a frequency band in which the set of filters specified by the filtering mode is effective, a gain level of the set of filters specified by the filtering mode, or a resonance level of the set of filters specified by the filtering mode. These criteria may be determined or updated by user input, for example.

In one implementation, the information includes ranked lists of audio filters and their parameters. Each list can include any number of audio filters and parameters, and each audio filter and parameter may be associated with an audio characteristic or combination of audio characteristics. Each ranked list can be associated with a virtual orientation. Further, all possible virtual orientations for any listening session are associated with a ranked list such that the audio processing module 320 can generate a binaural audio stream for any virtual orientation. That is, device data store stores ranked lists such that a listener at any location can perceive a talker at a real-world location corresponding to any of the virtual locations.

Returning to FIG. 1, the network represents the communication pathways between the client devices and the network system. In one embodiment, the network is the Internet, but can also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 3C:
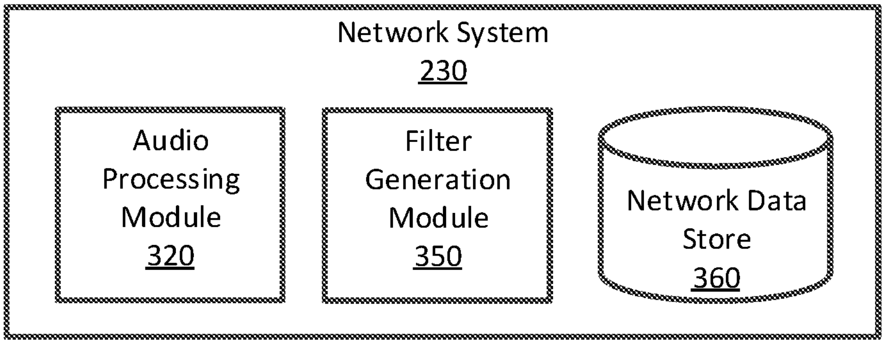
FIG. 3C is a diagram of a network system in the system environment.

FIG. 3C illustrates a diagram of a network system 230 for facilitating listening sessions between client devices via the network. The network system 230 includes an audio processing module 320, a filter generation module 350, and a network data store 360. In some implementations, the filter generation module 350 may be integrated with the audio processing module 320. The audio processing module 320 of the network system 230 functions similarly to the audio processing module 320 of a client device 210.

The filter generation module 350 generates audio filters and their constituent parameters for generating a binaural audio stream. In one example, given a certain filter type for a binaural audio filter, the binaural audio filter (e.g., a HRTF) is determined from empirical data captured from a real-world listening environment resembling a virtual environment. For example, if the binaural audio filter relates to an aggregate of audio filters (e.g., parametric IIR filters), the filter generation module can determine the set of audio filters (e.g., the parametric IIR filters) from the empirical data to approximate, in aggregate, the binaural audio filter. Each audio filter of the set reduces the error between an ideal binaural audio stream and a generated binaural audio stream. The ideal binaural audio stream is the binaural audio stream perceived by a listener listening to a talker in a real world location.

For instance, take the following example for generating a set of audio filters that approximate a binaural audio filter. A talker in a real-world location generates an audio stream at a real-world talker location. The network system records the generated audio stream at the real-world talker location. The network system additionally records the audio stream as perceived by a listener at a real-world listener location (i.e., the ideal binaural audio stream). The network system determines a binaural audio filter from the generated audio stream at the real-world talker location and the binaural audio stream as perceived by the listener. The relative spatial difference between the real-world talker and listener locations can be associated with a virtual orientation. That is, the difference in the real-world listening environment is translated to a virtual listening environment. The relative spatial differences and the virtual orientations may also be used to generate audio filters that approximate a binaural audio filter.

The filter generation module 350 generates a set of audio filters and their parameters that approximate the determined binaural audio filters. That is, the set of audio filters, in aggregate, approximate a binaural audio filter that can be used to generate the audio stream perceived by the listener at the real-world listener location. In some cases, each audio filter is associated with a particular characteristic of the generated binaural audio stream (e.g., resonance, gain, frequency, filter type, etc.).

Applying the generated audio filters to an audio stream generates a binaural audio stream that approximates a binaural audio stream generated by a binaural audio filter. Here, each audio filter from the set of audio filters applied to an audio stream may increase the accuracy of the generated binaural audio stream. The accuracy of the binaural audio stream is a measure of how dissimilar the generated binaural audio stream and ideal binaural audio stream are. For example, using three audio filters to generate a binaural audio stream more accurate (e.g., more similar to the ideal binaural audio stream) than a binaural audio stream generated from a single audio filter. In various embodiments, the accuracy of a binaural audio stream can be measured using a variety of metrics. For example the accuracy can be a difference in a frequency-domain response, a difference time-domain response or any other metric that can measure audio accuracy. Notably, in some embodiments, using more audio filter to generate a binaural audio stream may be non-linear in terms of accuracy improvement. That is, for a given combination of filters, or ordered combination of filters, the accuracy may change more or less than the accuracy for each filter individually.

The filter generation module 350 can associate each filter, or combination of filters, with an impact factor. In one example, the impact factor is a quantification of an amount of accuracy change in a generated binaural audio stream when applying a particular audio filter or combination of audio filters. For example, if an audio filter increases the accuracy of a generated binaural audio stream by 5% its impact factor may be 5. If a second audio filter increases the accuracy of a generated binaural audio stream by 3% its impact factor may be 3. In one example, the first and second audio filters may have a combined impact factor of 8, while in other examples the combined impact factor is some other number.

In another example, the impact factor is a quantification of the importance for a particular audio filter. For example, the audio filters for a particular virtual orientation are an audio filter for increasing gain in the speech spectrum and an audio filter for reducing a specific frequency (e.g., a noise band). The filter for reducing the a specific frequency increases the accuracy of the generated binaural audio stream to a greater degree than the filter for increasing gain. However, in this example, the virtual listening environment is for conducting a business meeting. As such, increasing the gain in the speech frequency region is more important than reducing a specific frequency. As such, the impact factor for the increasing gain in speech region filter is higher than the frequency removal filter despite the floor filter increasing the accuracy to a greater degree. The importance for each filter can be defined by a listener, a talker, the virtual listening environment, or any other information within the environment.

The filter generation module 350 can rank the filters for a particular virtual orientation. In one configuration, the filters are ranked based on the impact factor. For example, the filters that increase the accuracy to the greatest degree are ranked highest. In another example, filters that are most important for the virtual listening environment are ranked highest.

The filter generation module 350 determines a resource requirement for each filter. While applying additional audio filters to an audio stream increases the accuracy of the generated binaural audio stream, it can also increase the amount of computational resources required. Additionally, applying additional audio filters to an audio stream may be non-linear in terms of resource requirements. That is, for a given combinations of audio filters, or ordered combinations of audio filters, the resource requirement may be more or less than the resource requirement for each filter individually. The filter generation module 350 associates a resource requirement with each filter.

The filter generation module 350 stores the ranked filters and their associated resource requirements in the network data store. In some cases, the ranked filters and their associated resource requirements are transmitted to a client device via the network. The client devices may store the ranked filters and their associated resource requirements in the device datastore.

In general, the generation of the binaural audio stream may proceed as follows. The predefined filtering modes are stored in a data store accessible to the computation device (e.g., audio processing module). In some implementations, the stored set of filtering modes may be updated by accessing the network system. When the computation device receives an incoming audio stream, the computation device may select one of these filtering modes for binaural audio filtering based on the determined measure of processing capability. After a filtering mode has been selected, filter parameters for the filters specified by the selected filtering mode can be determined based on the relative position of the virtual talker location and the virtual listener location. The filter parameters for the filters specified by the selected filtering mode may control any one of a gain, frequency, timbre, spatial accuracy, and resonance when generating the binaural audio stream. In such case, the determination of the filter parameters may be further based on any one of a desired gain, frequency, timbre, spatial accuracy, and resonance.

In some implementations, the data store may store, for each filtering mode, a plurality of relative positions and associated filter parameters for the filters specified by the respective filtering mode. Then, the filter parameters for the filters specified by the filtering mode can be determined based on the stored filter parameters. This may involve, for a selected filtering mode and a given relative position, using those filter parameters in the data store that have an associated relative position that is most similar to the given relative position. This may imply that an appropriate similarity metric for relative positions is defined. Alternatively, the filter parameters may be determined by interpolation methods that interpolate between two or more associated relative positions that are most similar to the given relative position.

In some implementations, the filtering mode to be used for the binaural audio filtering is selected by ranking the predefined set of filtering modes based on one or more criteria (e.g., the criteria listed above). For such ranked filtering modes, the selection may be to pick that filtering mode that is highest ranked among all those filtering modes that could be implemented with the determined processing capability. For example, the computation device may first determine all those filtering modes that it could implement with its available processing capability, and then select, among these filtering modes, the highest ranked filtering mode.

The network system 230 and client devices 210 include a number of "modules," which refers to hardware components and/or computational logic for providing the specified functionality. A module can be implemented in hardware, firmware, and/or software (e.g., a hardware server comprising computational logic). It will be understood that the named components represent one embodiment of the disclosed method, and other embodiments can include other components. In addition, other embodiments can lack the components described herein and/or distribute the described functionality among the components in a different manner. Additionally, the functionalities attributed to more than one component can be incorporated into a single component. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the media hosting service, loaded into memory, and executed by one or more processors of the system's computers.

The present disclosure is to be understood to relate to the methods described herein, as well as to corresponding computation devices (host devices, client devices, etc.), computer programs, and computer-readable storage media storing such computer programs.

Audio Filters

The audio filters (e.g., specified by the filtering modes) used to approximate a binaural audio filter can include any number or type of audio filter or audio processing technique to generate a binaural audio stream.

Binaural synthesis consists in filtering a monophonic sound S by a pair of HRTFs (left and right) corresponding to a source S at location P. The synthesized audio is played back on a dual channel audio playback device, such as a playback device comprising a pair of headphone loudspeakers, for example. Accordingly, methods according to embodiments of this disclosure may include rendering a generated binaural audio stream to the left and right loudspeakers of a headphone. The binaural signals contain the auditory spatial cues corresponding to position P such that the listener auditory perceives the source S virtually placed at location P.

Several examples of filtering modes for implementing or modeling the binaural audio filtering (e.g., HRTF filtering) will be described below. Any of these filtering modes can be included in the predefined set of filtering modes for the binaural audio filtering according to embodiments of the disclosure.

In some examples, binaural synthesis can emulate moving sources. The methods consists of commuting between pairs of HRTF filters. That is, for 1 virtual source, one may use 4 filters to perform moving source spatialization.

To emulate moving sources in a more efficient manner, (virtual) spatial audio panning may be used. (Virtual) spatial audio panning pans each of one or more sound sources (e.g., talkers) to a set of virtual loudspeakers at respective virtual loudspeaker locations (e.g., in a 2.1 configuration, 5.1 configuration, 7.1 configuration, 7.2.1 configuration, etc.). This yields a set of virtual loudspeaker audio streams, one for each virtual loudspeaker. These virtual loudspeaker audio streams can then be subjected to binaural audio filtering, based on relative positions of respective virtual loudspeaker locations to the virtual listener location, yielding individual binaural audio streams. A binaural audio stream that captures the perceived sound from the plurality of sound sources at the virtual listener location can then be obtained by combining (e.g., summing) the individual binaural audio streams. This procedure has several advantages. For example, virtual movement of one of the sound sources can be implemented by adjusting the virtual panning of the moving sound source's audio stream to the set of virtual loudspeakers. This can be achieved by adjusting the panning gains for this audio stream for the set of virtual loudspeakers. Further, virtual spatial audio panning has the advantage that the required computational capacity does not scale with the actual number of sound sources, but rather with the number of virtual loudspeakers. Accordingly, the computation device can receive and process a large number of audio streams for respective sound sources at a reasonable processing cost.

In accordance with the above, the predefined set of filtering modes can include at least one virtual panning filtering mode that specifies filters for binaurally rendering panned audio streams resulting from virtual panning of the audio stream to respective virtual loudspeakers at virtual loudspeaker locations to the virtual listener location. Each of these virtual panning filtering modes may specify a pair of HRTF filters for each virtual loudspeaker location.

HRTF filters can be modeled in a variety of manners. One method of HRTF modelling uses finite impulse response. HRTF FIR filter represents a straight forward approach of performing binaural audio synthesis. In this approach HRTFs measurements are used with time or frequency domain convolution. The predefined set of filtering modes can include at least one filtering mode that specifies a set of filters for filtering the audio stream in the frequency domain. The set of filters may relate to a pair of FIR filters for implementing HRTFs, e.g., one for the listener's left ear and one for the listener's right ear. FIR HRTFs are very precise at high frequencies. The drawbacks to this approach may include, for example, FIR HRTFs usually include many coefficients (e.g., 256 or 512 coefficients for one FIR filter). FIR HRTFs can also have lower precision for low frequencies. In addition, in some cases, frequency domain convolution using FFTs are not available in all DSPs and time domain convolution is too slow for real-time processing. Accordingly, the predefined set of filtering modes can further include at least one filtering mode that specifies a set (e.g., pair) of filters for filtering the audio stream in the time domain. In case that the computation device is not capable of implementing frequency-domain filtering, it may resort to one of the time-domain filtering modes. Whether or not the computation device is capable of implementing frequency-domain filtering may be decided based on the determined measure of processing capability of the computation device.

Another method of HRTF modelling uses infinite impulse response (IIR). IIR filters are examples of filters for filtering the audio signal in the time domain. Magnitude response of HRTFs is modelled with IIR filters. Here, the IIR HRTF models include a delay between the ears to account for inter-aural time delay. Various techniques can be used to model original HRTF filters into IIR HRTFs. For example, some modelling algorithms include: yulewalk, steiglitz mcbride, prony.

IIR HRTF models can be implemented using cascades (i.e., a product) of second order sections. The benefits of IIR HRTF models are that IIR filters are scalable because the number of modelling IIRs can be set. IIR HRTF usually has fewer than coefficients than FIR HRTFs (e.g., 100 coefficients). The drawbacks of such IIR modelling is that IIR coefficients are arbitrary and cannot be adapted after modelling. The predefined set of filtering modes can include at least one time-domain cascaded filtering mode that specified a set (e.g., pair) of cascaded time-domain filters. The constituents of the cascaded time-domain filters may be the second order sections.

In some implementations, the predefined set of filtering modes includes a plurality of time-domain cascaded filtering modes. Each of these time-domain cascaded filtering modes specifies a set (e.g., pair) of cascaded time-domain filters with an associated number of time-domain filters in the cascade. Accordingly, the complexity of the binaural audio filtering can be scaled by selecting from the time-domain cascaded filtering modes with different (e.g., gradually increasing) associated numbers of time-domain filters in the cascade. Selecting the filtering mode from the predefined filtering mode can then include selecting a time-domain cascaded filtering mode from among the plurality of time-domain cascaded filtering modes based on the determined measure of processing capability. For example, the time-domain cascaded filtering mode with the largest associated number of time-domain filters in the cascade that can still be implemented with the available processing capability can be selected. Then, for the selected time-domain filtering mode, individual time-domain filters can be selected from a predefined set of time-domain filters up to the associated number of the selected time-domain cascaded filtering mode. The selected individual time-domain filters can then be used to construct the cascaded time-domain filters for the binaural audio filtering. If the filter parameters of the time-domain filters are fixed in accordance with a previous modeling procedure, selecting the individual time-domain filters from the predefined set of time-domain filters can also be seen as part of determining the filter parameters for the filters specified by the selected time-domain cascaded filtering mode.

Another method of HRTF modelling uses parametric IIR modelling (PIIR). PIIR HRTFs are modeled using parametric IIRs. In one example, the $2^{nd}$ order IIR filter is driven by 6 coefficients (a0, a1, a2, b0, b1, b2). In coefficient form, the terms are meaningless. In the PIIR format, these coefficients are now computed via the 4 parameters (frequency, gain, resonance and filter type). Thus, the meaningless IIR coefficients are linked to meaningful parameters. Additionally, with a PIIR HRTF it is possible to control the trade-off between spectral coloration and spatial perception. Accordingly, the predefined set of filtering modes may include at least one parametric IIR filtering mode that specifies a set of parametric IIR filters. In accordance with the above, the parametric IIR filters may be constituents of cascaded time-domain filters.

Another type of audio filter includes spherical harmonics modelling. Thus, the predefined set of filtering modes can include at least one spherical harmonics filtering mode that specifies a set (e.g., pair) of filters that are modeled based on a set of spherical harmonics. In this audio filter the HRTF database may consist of various HRTFs samples around a given listener. These HRTFs samples can be seen as spatial samples of the directivity function of the listeners head considered as a microphone. Density of the sampling of directivity function (i.e., the number of HRTF measurements) allows for spatial decomposition (encoding) into spherical harmonics functions (up to order N, depending on the spatial distribution of HRTF sampling grid). In this audio filter, binaural synthesis consists of recomposing (decoding) virtual source direction (HRTF) with spherical harmonics, up to a maximum order in encoding. The spherical harmonics modeling depends on CPU possibilities. A benefit of spherical harmonic modelling is to offer flexible spatial resolution and interpolation. On the contrary, the drawbacks of spherical harmonic modelling are that it is generally processed in frequency domain and its decoding accuracy depends on accuracy of encoding (which is driven by the spatial sampling grid of HRTFs). In line with this, the predefined set of filtering modes can include a plurality of spherical harmonics filtering modes. Each spherical harmonics filtering mode specifies a set (e.g., pair) of filters that are modeled based on a set of spherical harmonics up to a given order N of spherical harmonics. It is understood that different spherical harmonics filtering modes relate to different orders N. Then, selecting the filtering mode from among the predefined set of filtering modes may include selecting, based on the determined measure of processing capability, that spherical harmonics filtering mode from among the plurality of spherical harmonics filtering modes that has the highest order N of spherical harmonics that can still be implemented by the computational device, given its processing capability.

Various other simple models other than those mentioned above have been developed. These cost-efficient models do not aim for high spatial accuracy but more towards giving the perception of spatial directions. Some models use, for example, a spherical model for a head and torso. Simple modelling can also include modeling ILD (interaural level difference) into a frequency dependent weighted cosine functions. An ILD model is computed to fit the average ILD curve among a set of subjects. The ILD format is not resource intense and allows for the reproduction of horizontal plane binaural. However, the reproduction is only in the frequency domain.

Another model can use some aspects of the various models described herein. For example a model can operate in the time-domain, be scalable, and be tunable. Time domain processing means that it is available for all digital signal processors. A scalable models means that the filter process can adapt based on the available CPU resources. A tunable model means that a user can adapt characteristics based on the desired tradeoff for spatialization and/or coloration. The model includes IIR modeling that allows determination of the average ILD in the horizontal plane. The modeling can use the Nelder-Mead algorithm to find the best least square model fitting the desired ILD curve.

In one particular example of the curve the fitting method, all parameters (center frequency, gain, resonance) of the filters can vary. Second order sections are then ordered from the most important to less important. Importance is decided upon various criteria. The criteria can include minimization of least square error, the characteristics of the parametric filter, if the parametric filter is prominent or not (whether the gain and resonance of the filter are high).

In some examples, the model can then be used with one or a few biquad sections (simple model). The model can also include a high fidelity model using the whole cascade of second order sections.

In some examples, the model can also control spectral content. The control allows for control the tradeoff between spatial quality and timbre quality. Additionally the model allows to fine tune the audio spectrum to improve the spatial perception on an individual basis (i.e., for a given listener).

Generating a Binaural Audio Stream

Figure 5A:
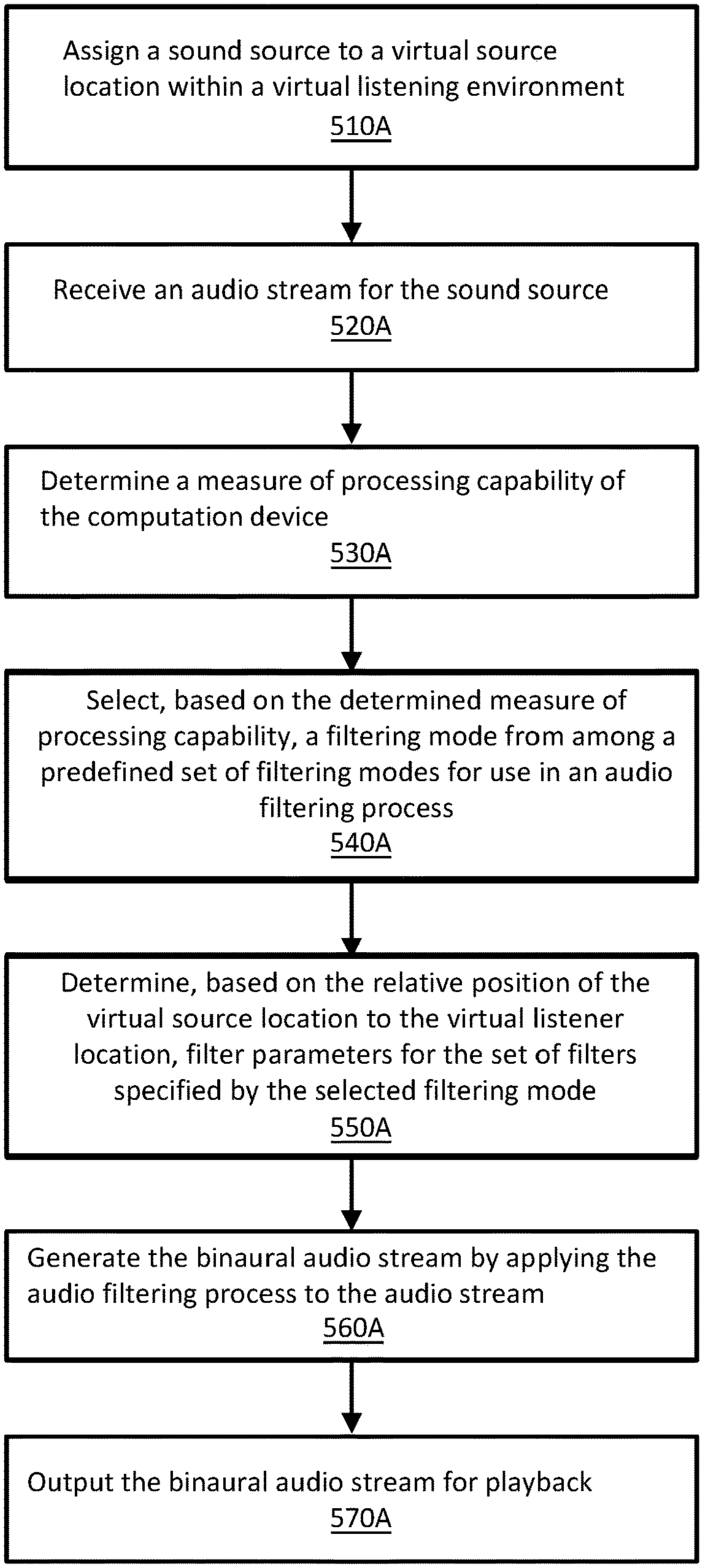
FIG. 5A and FIG. 5B are flow diagrams of methods for generating a binaural audio stream reproducing a source at a source location for a listener at a listening location for a listening environment.

FIG. 5A is a flow diagram illustrating an example of a method of generating a binaural audio stream. The method is understood to be performed by a computational device. At step 510A, a sound source (e.g., talker) is assigned to a virtual source location within a virtual listening environment. The virtual source location may be determined based on a number (count) of sound sources that are to be rendered, or a predetermined set of source locations in the virtual listening environment, etc. The virtual source location has a relative position (virtual orientation) to a virtual listener location in the virtual listening environment. A listener is assumed to be assigned to the virtual listener location. At step 520A, an audio stream for the sound source is received. At step 530A, a measure of processing capability (e.g., resource availability, CPU availability, available processing power) of the computation device is determined. At step 540A, a filtering mode is selected from a predefined set of filtering modes, based on the determined measure of processing capability. The filtering mode is intended for use in an audio filtering process. The audio filtering process in turn is intended to convert the received audio stream into a binaural audio stream. Each filtering mode specifies a respective set of filters. The set of filters for each filtering mode may include two filters, one relating to (an impulse response of) a propagation path from the virtual source location to a left ear of a virtual listener at the virtual listener location and one relating to (an impulse response of) a propagation path from the virtual source location to a right ear of the virtual listener. The filters may implement HRTFs, for example. At step S550A, filter parameters for the set of filters specified by the selected filtering mode are determined, based on the relative position of the virtual source location to the virtual listener location. At step 560A, the binaural audio stream is generated by applying the audio filtering process to the audio stream, using the set of filters specified by the selected filtering mode and the determined filter parameters for the set of filters. The binaural audio stream is intended to allow a listener at the virtual listener location to perceive sound from the sound source as emanating from the virtual source location. Accordingly, the binaural audio stream may be intended for playback through the left and right loudspeakers of a headset (pair of headphone loudspeakers). At step 570A the binaural audio stream is output for playback. Playback may be performed by a playback device, for example. The playback device may comprise or be coupled to a pair of headphone loudspeakers, for example. The method may further comprise (not shown) rendering the generated binaural audio stream to the left and right loudspeakers of the pair of headphone loudspeakers.

Figure 5B:
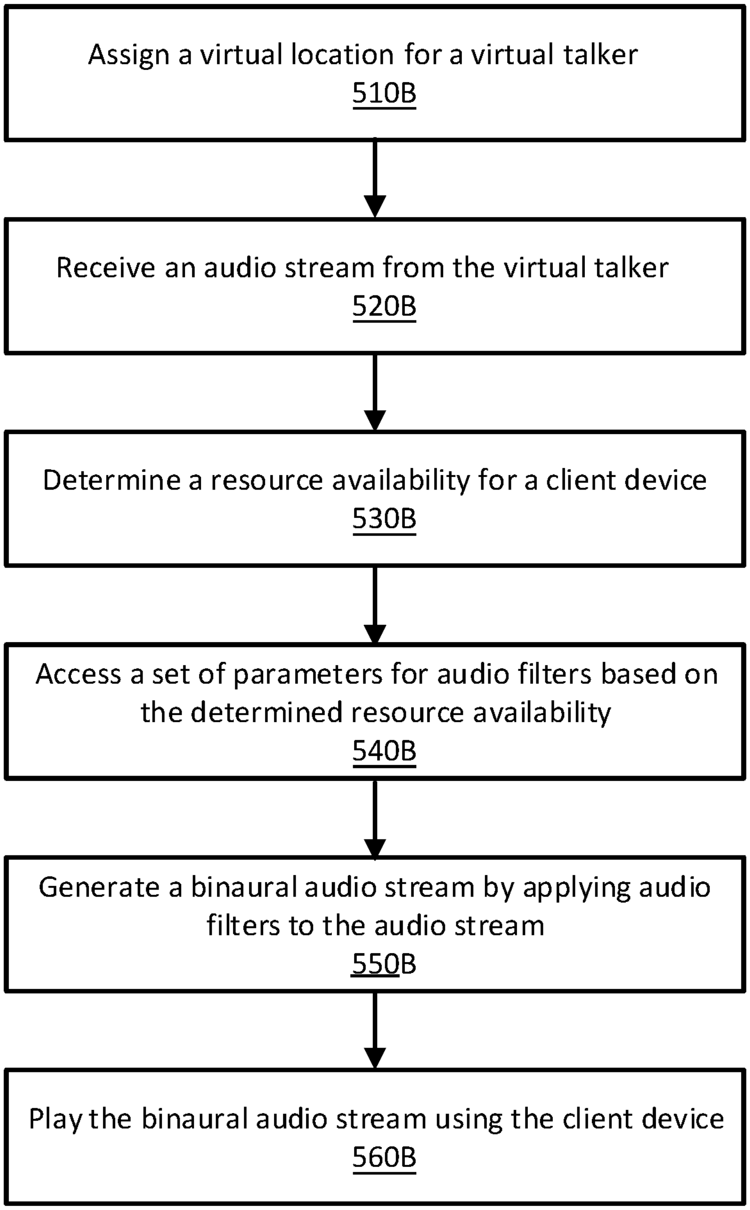

FIG. 5B is a flow diagram of another example of one method for generating a binaural audio stream, according to one example embodiment. It is understood that the described details of the methods of FIG. 5A and FIG. 5B may be combined where appropriate. For example, the process may be performed by a client device (e.g., an audio processing module executing on the client device) in the environment. In other embodiments, the process is performed by a network system in the environment. In other examples, other modules may perform some or all of the steps of the process in other embodiments. Likewise, embodiments may include different and/or additional steps, or perform the steps in different orders.

To begin, a listener using a client device initiates a listening session. In the non-limiting example described below, the listening session relates to a virtual conferencing session. However, the present disclosure likewise relates to alternative listening sessions. Any number of talkers using a client device can connect to the listening session via the network. The listener creates a listening environment including the talkers connected to the listening session. The listener assigns 510B each talker as a virtual talker at a virtual speaking location to create the listening environment. The listener also can assign himself a virtual listening location in the listening environment. The specific manner in which the virtual positions are assigned is not of particular importance for the described methods. Each virtual talker location has a virtual orientation (i.e., relative position to the virtual listener location). The virtual orientation is the position of the virtual talker at a virtual speaking location relative to the position of the listener at the virtual listening location in the environment. In some examples, the listener and virtual talkers are automatically assigned to a location in the listening environment by the audio processing module.

A talker (as a non-limiting example of a sound source) generates an audio stream. Generally, the audio stream is a recording of the talker's voice by his client device. The audio stream is transmitted to the listener client device via the network and the listener client device receives 520B the audio stream via the processing module. The processing module associates the audio stream with the talker's virtual talker location in the listening environment. Accordingly, the audio stream is associated with the virtual talker location corresponding to the virtual talker.

The processing module determines 530B a resource availability of the listener's client device. In this example, the processing module sends a resource query to a processor of the listener client device and receives a resource availability in response. Here, the resource availability is the amount of available processing power that the processing module may use to generate a binaural audio stream.

The processing module accesses 540B a set of audio filters and filter parameters to apply based on the determined resource availability and the virtual orientation. For example, the set of audio filters is selected from a ranked list of audio filters associated with the virtual orientation. The ranked list of audio filters is stored in the device data store of the listener client device. The number of selected audio filters is based on the determined resource availability. For example, a ranked list of audio filters for a particular virtual orientation includes ten audio filters. Here, each of the audio filters uses approximately 5% processing power to implement when generating a binaural audio stream. The determined resource availability for the listener client device is 18% processing power. Accordingly, the processing module selects the three highest ranked audio filters for generating a binaural audio stream.

The processing module generates 550B a binaural audio stream by applying the selected audio filters. In this example, the audio filters are a set of audio filters that approximate a binaural audio filter where each additional audio filter of the set applied to the audio stream generates a more accurate binaural audio stream. The binaural audio stream portrays the audio stream of the virtual talker within the listening environment. Additionally, the binaural audio stream allows the listener at the virtual listener location to perceive the virtual talker at the virtual talker location. That is, the binaural audio stream allows the listener to perceive the speech of the talker as if the talker was at a real-world location corresponding to the virtual speaking location. For example, if the listener assigned the talker as a virtual talker with a virtual orientation "to the right" of the listener location, the listener would hear the speech of the talker as if they were located to the right of the listener.

After generating the binaural audio stream, the processing module provides the binaural audio stream to the listener audio device for audio playback. The listener audio devices plays 560A the binaural audio stream using the client device 210. The binaural audio stream may be played back by an audio playback device of the listener client device or, in various other configurations, by an audio playback device connected to the listener client device (e.g., headphones, loudspeakers, etc.).

Example Virtual Listening Environment

Figure 6:
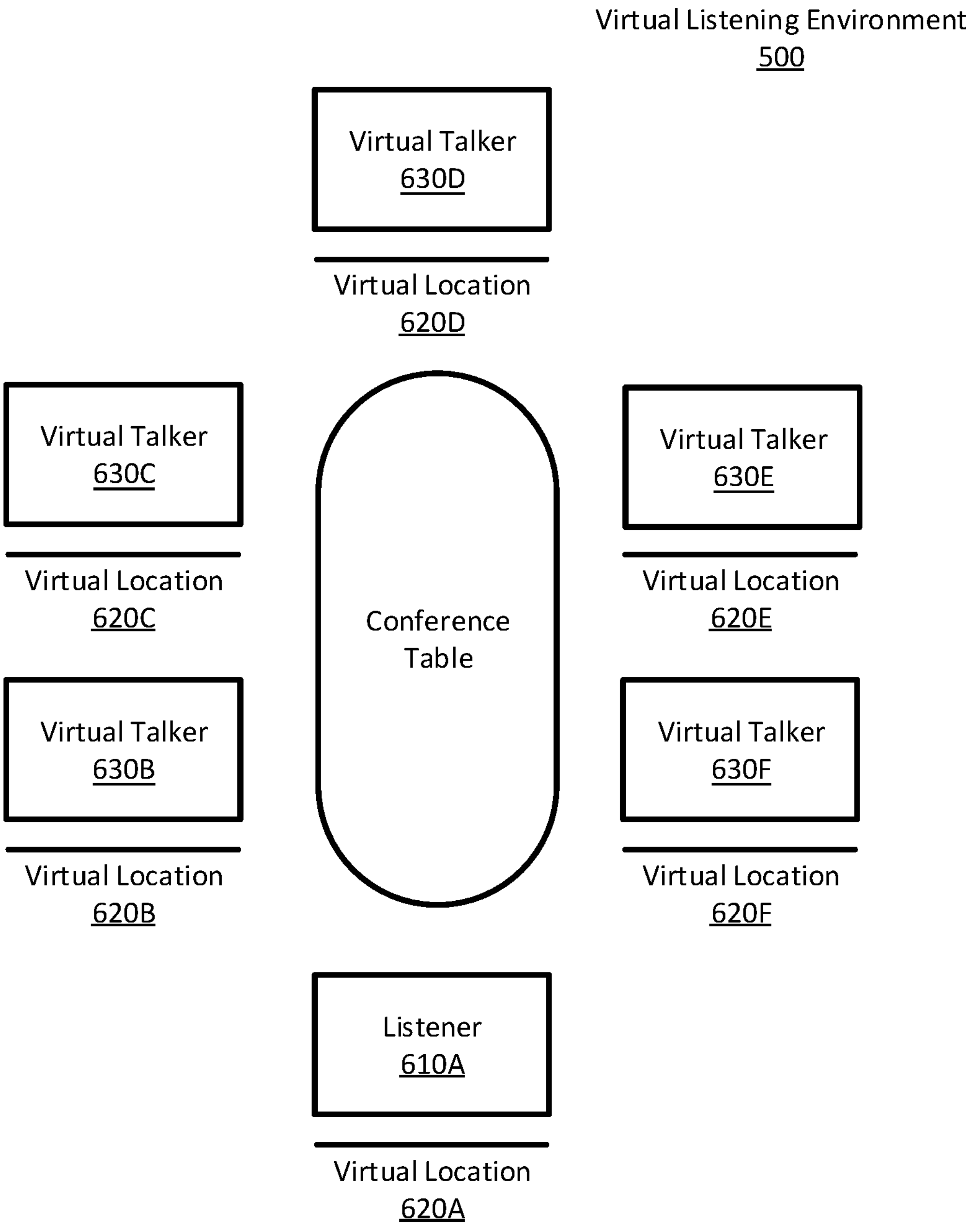
FIG. 6 is an illustration of a virtual listening environment.

FIG. 6 is a diagram of a virtual listening environment created by a listener in a listening session. The virtual environment includes six virtual locations oriented similarly to six chairs around a virtual conference table. In this example, the listener 610 assigns himself to a virtual location 620 (e.g., a virtual listener location) at the head of the conference table. The listener assigns five talkers connected to the listening session as virtual talkers 630 at virtual locations B, C, D, E, and F (e.g., virtual talker location). Each virtual talker location has a virtual orientation (relative position to the virtual listener location).

In one example of method, a listener assigns each talker in a listening session to a virtual talker at a virtual talker location. The processing module receives an audio stream from a talker assigned as virtual talker at virtual talker location. The audio processing module 320 determines a resource availability for the listener's client device. The processing module then accesses a set of filters and filter parameters to generate a binaural audio stream based on the virtual orientation and the determined resource availability, for example in the manner described above. The audio processing module 320 generates a binaural audio stream from the audio stream using the audio filter and the accessed parameters. The binaural audio stream is provided to the listener client device and the listener client devices plays back the binaural audio stream. The binaural audio stream represents the talker at the virtual location. In other words, the listener perceives the talker at a real-world location corresponding to the virtual location.

Additional Configuration Considerations

Unless specifically stated otherwise, as apparent from the following discussions, it is appreciated that throughout the disclosure discussions utilizing terms such as "processing," "computing," "calculating," "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects and implementations of the present disclosure may be appreciated from the enumerated example embodiments (EEEs) listed below.

EEE 1. A method performed by a computation device for generating a binaural audio stream, the method comprising:

assigning a sound source to a virtual source location within a virtual listening environment, the virtual source location having a relative position to a virtual listener location in the virtual listening environment;

receiving an audio stream for the sound source;

determining a measure of processing capability of the computation device;

selecting, based on the determined measure of processing capability, a filtering mode from among a predefined set of filtering modes for use in an audio filtering process, wherein the audio filtering process is intended to convert the audio stream into a binaural audio stream and wherein each filtering mode specifies a respective set of filters;

determining, based on the relative position of the virtual source location to the virtual listener location, filter parameters for the set of filters specified by the selected filtering mode;

generating the binaural audio stream by applying the audio filtering process to the audio stream, using the set of filters specified by the selected filtering mode and the determined filter parameters for the set of filters, wherein the binaural audio stream is intended to allow a listener at the virtual listener location to perceive sound from the sound source as emanating from the virtual source location; and outputting the binaural audio stream for playback.

EEE 2. The method according to EEE 1, wherein the generated binaural audio stream is intended for playback through the left and right loudspeakers of a headset.

EEE 3. The method according to any one of the preceding EEEs, wherein determining the measure of processing capability of the computation device is repeatedly performed to thereby monitor the processing capability of the computation device.

EEE 4. The method according to any one of the preceding EEEs, wherein determining the measure of processing capability of the computation device includes at least one of:

determining a processor load for a processor of the computation device;

determining a number of processes running on the computation device;

determining an amount of free memory of the computation device;

determining an operating system of the computation device; and determining a set of device characteristics of the computation device.

EEE 5. The method according to any one of the preceding EEEs, wherein selecting the filtering mode from among the predefined set of filtering modes comprises:

ranking the filtering modes in the predefined set of filtering modes based on one or more criteria;

determining, based on the determined measure of processing capability, those filtering modes that the computation device can implement in the audio filtering process; and selecting the filtering mode that is highest ranked among those filtering modes that the computation device can implement in the audio filtering process.

EEE 6. The method according to the preceding EEE, wherein the one or more criteria include at least one of:

an indication of an error between an ideal binaural audio stream and a binaural audio stream that would result from applying the audio filtering process using the set of filters specified by the filtering mode;

a frequency band in which the set of filters specified by the filtering mode is effective;

a gain level of the set of filters specified by the filtering mode; and a resonance level of the set of filters specified by the filtering mode.

EEE 7. The method according to any one of the preceding EEEs, wherein the predefined set of filtering modes includes at least one filtering mode specifying a set of filters for filtering the audio stream in the frequency domain and at least one filtering mode specifying a set of filters for filtering the audio stream in the time domain.

EEE 8. The method according to any one of the preceding EEEs, wherein the predefined set of filtering modes includes at least one time-domain cascaded filtering mode specifying a set of cascaded time-domain filters.

EEE 9. The method according to the preceding EEE, wherein the predefined set of filtering modes includes a plurality of time-domain cascaded filtering modes that respectively specify sets of cascaded time domain filters with associated numbers of time-domain filters in respective cascades;

wherein selecting the filtering mode from among the predefined set of filtering modes comprises:

selecting a time-domain cascaded filtering mode from among the plurality of time-domain cascaded filtering modes based on the determined measure of processing capability; and for the selected time-domain cascaded filtering mode, selecting time-domain filters from a predefined set of time-domain filters, up to the number of time-domain filters associated with the selected filtering mode and constructing cascaded time-domain filters for the audio filtering process using the selected time-domain filters.

EEE 10. The method according to any one of the preceding EEEs, wherein the predefined set of filtering modes includes at least one spherical harmonics filtering mode specifying a set of filters that are modeled based on a set of spherical harmonics.

EEE 11. The method according to the preceding EEE, wherein the predefined set of filtering modes includes a plurality of spherical harmonics filtering modes that respectively specify filters that are modeled based on a set of spherical harmonics up to respective orders of spherical harmonics;

wherein selecting the filtering mode from among the predefined set of filtering modes comprises:

selecting, based on the determined measure of processing capability, that spherical harmonics filtering mode from among the plurality of spherical harmonics filtering modes that has the highest order of spherical harmonics that can still be implemented by the computational device.

EEE 12. The method according to any one of the preceding EEEs, wherein the predefined set of filtering modes includes at least one virtual panning filtering mode specifying filters for binaurally rendering panned audio streams resulting from virtual panning of the audio stream to respective virtual loudspeakers at virtual loudspeaker locations to the virtual listener location.

EEE 13. The method according to the preceding EEE, further comprising:

implementing virtual movement of the sound source by adjusting the virtual panning of the audio stream to the virtual loudspeakers.

EEE 14. The method according to any one of the preceding EEEs, wherein the parameters for the set of filters specified by the selected filtering mode control at least one of gain, frequency, timbre, spatial accuracy, and resonance when generating the binaural audio stream.

EEE 15. The method according to any one of the preceding EEEs, wherein the predefined set of filtering modes is stored at a storage location of the computation device, and the method further comprises:

accessing a network system to update the predefined set of filtering modes stored in the storage location of the computation device.

EEE 16. The method according to any one of the preceding EEEs, wherein the computation device is part of a client device or implemented by the client device.

EEE 17. A computation device comprising a processor configured to perform the method according to any one of the preceding EEEs.

EEE 18. A computer program including instruction that, when executed by a computation device, cause the computation device to perform the method according to any one of EEEs 1 to 16.

EEE 19. A computer-readable storage medium storing the computer program according to the preceding EEE.

Further aspects and implementations of the present disclosure may be appreciated from the following EEEs listed below.

EEE 20. A method for generating a binaural audio stream, the method comprising:

assigning a virtual talker (e.g., speaker) to a virtual talker location of a plurality of virtual talker locations, each virtual talker location having a relative position to a listener at a virtual listener location;

receiving an audio stream from the virtual talker;

determining a resource availability for a client device of the listener;

accessing a set of parameters for the virtual talker location, the set of parameters for use in an audio filter that converts the audio stream into a binaural audio stream;

generating a binaural audio stream by applying the audio filter to the audio stream using the set of parameters, the binaural audio stream portraying the audio stream of the virtual talker and allowing the listener at the virtual listener location to perceive the virtual talker at the virtual talker location;

providing the binaural audio stream for playback on an audio playback device of the client device of the listener.

EEE 21. The method of EEE 20, further comprising:

assigning the listener to the virtual listener locations of a plurality of virtual listener locations.

EEE 22. The method of EEE 20, wherein determining the resource availability of the client device of the listener includes any of:

determining a processor load for a processor of the client device;

determining a number of applications running on the client device;

determining an amount of free memory of the client device;

determining an operating system of the client device; and determining a set of device characteristics of the client device.

EEE 23. The method of EEE 20, wherein accessing the set of parameters for the virtual talker location further comprises:

ranking a plurality of parameters based on a criteria;

determining a number of parameters that the client device can implement in the audio filer based on the determined resource availability;

selecting the set of parameters that are the highest ranked of the plurality of parameters, the set of parameters including the determined number of parameters.

EEE 24. The method of EEE 23, wherein the criteria is any of:

an error for the parameter;

a frequency band of the parameter;

a gain level of the parameter; and a resonance level of the parameter.

EEE 25. The method of EEE 23, wherein the criteria is determined by the client device of the listener.

EEE 26. The method of EEE 23, wherein the client device of the listener determines the number of parameters.

EEE 27. The method of EEE 20, wherein the set of parameters control any of gain, frequency, timbre, spatial acuity, and resonance when generating the binaural audio stream.

EEE 28. The method of EEE 20, wherein the set of parameters are stored at a storage location of the client device, and the method further comprises:

accessing a network system to update the set of parameters stored in the storage location of the client device.

EEE 29. The method of EEE 20, wherein the set of parameters are determined using an audio stream generated by a talker at a real-space speaking location and recorded by the client device of the listener at a real-space listening location.

EEE 30. The method of EEE 20, wherein the audio filter is any of a head transfer function, an infinite impulse response filter, a spherical harmonics model, or a binaural synthesizer.

What is claimed is:

1. A method performed by a computing device for generating a binaural audio stream based on a virtual environment, the method comprising:

panning one or more audio streams of one or more sound sources to a set of virtual loudspeakers at respective virtual loudspeaker locations to yield a set of virtual loudspeaker audio streams, wherein each of the one or more sound sources is assigned to a different virtual source location in the virtual environment;

selecting a filtering mode among a predefined set of filtering modes based on a processing capability of the computing device;

determining, based on a relative position of each virtual source location to a virtual listener location in the virtual environment, filter parameters for a set of audio filters corresponding to the selected filtering mode;

performing a binaural audio filtering process on the set of virtual loudspeaker audio streams, using the set of audio filters and the determined filter parameters, to yield a set of individual binaural audio streams, based on relative positions of respective virtual loudspeaker locations to the virtual listener location; and generating the binaural audio stream by combining one or more of the set of individual binaural audio streams, wherein the binaural audio stream is configured to enable a listener at the virtual listener location to perceive a sound from the one or more sound sources as emanating from respective virtual source locations.

2. The method of claim 1, further comprising: adjusting the panning of the one or more audio streams to the set of virtual loudspeakers to implement virtual movement of the one or more sound sources.

3. The method of claim 1, further comprising: adjusting a panning gain of one of the set of virtual loudspeaker audio streams to implement virtual movement of one sound source corresponding to the one of the set of virtual loudspeaker audio streams.

4. The method of claim 1, wherein the selected filtering mode is a virtual panning filtering mode, wherein performing the binaural audio filtering process further comprises:

using the virtual panning filtering mode specifying a pair of head-related transfer function (HRTF) filters for each virtual loudspeaker location.

5. The method of claim 4, wherein determining the filter parameters further comprises:

determining, based on the relative positions of the respective virtual loudspeaker locations to the virtual listener location, filter parameters for the pair of HRTF filters corresponding to the virtual panning filtering mode.

6. The method of claim 4, wherein the pair of HRFT filters are modelled using an infinite impulse response (IIR) to form a pair of IIR HRTF filters.

7. The method of claim 6, wherein the pair of HRFT filters are modelled using the IIR by applying an IIR HRFT model using cascades of second order sections.

8. The method of claim 7, further comprising: ordering the second order sections from the most important to the least important based upon at least one of minimization of least square error or filter parameters of the HRTF filters.

9. The method of claim 1, wherein the filter parameters include at least one of gain, frequency, timbre, spatial accuracy, or resonance.

10. The method of claim 1, further comprising ranking the predefined set of filtering modes based on one or more criteria comprising at least one of:

an indication of an error between an ideal binaural audio stream and a generated binaural audio stream using a set of audio filters corresponding to each filtering mode;

a frequency band in which the set of audio filters corresponding to each filtering mode are effective;

a gain level of the set of audio filters corresponding to each filtering mode;

a resonance level of the set of audio filters corresponding to each filtering mode; or an impact factor indicating an amount of accuracy change in the generated binaural audio stream using the set of audio filters corresponding to each filtering mode.

11. A system for generating a binaural audio stream based on a virtual environment, comprising:

at least one processor; and a memory storing instructions thereon that, when executed by the at least one processor, cause the at least one processor to perform operations, comprising:

panning one or more audio streams of one or more sound sources to a set of virtual loudspeakers at respective virtual loudspeaker locations to yield a set of virtual loudspeaker audio streams, wherein each of the one or more sound sources is assigned to a different virtual source location in the virtual environment;

selecting a filtering mode among a predefined set of filtering modes based on a processing capability of a computing device;

determining, based on a relative position of each virtual source location to a virtual listener location in the virtual environment, filter parameters for a set of audio filters corresponding to the selected filtering mode;

performing a binaural audio filtering process on the set of virtual loudspeaker audio streams, using the set of audio filters and the determined filter parameters, to yield a set of individual binaural audio streams, based on relative positions of respective virtual loudspeaker locations to the virtual listener location; and generating the binaural audio stream by combining one or more of the set of individual binaural audio streams, wherein the binaural audio stream is configured to enable a listener at the virtual listener location to perceive a sound from the one or more sound sources as emanating from respective virtual source locations.

12. The system of claim 11, the operations further comprising: adjusting a panning gain of one of the set of virtual loudspeaker audio streams to implement virtual movement of one sound source corresponding to the one of the set of virtual loudspeaker audio streams.

13. The system of claim 11, wherein the selected filtering mode is a virtual panning filtering mode, wherein performing the binaural audio filtering process further comprises:

using the virtual panning filtering mode specifying a pair of head-related transfer function (HRTF) filters for each virtual loudspeaker location.

14. The system of claim 13, wherein determining the filter parameters further comprises:

determining, based on the relative positions of the respective virtual loudspeaker locations to the virtual listener location, filter parameters for the HRTF filters corresponding to the virtual panning filtering mode.

15. The system of claim 11, wherein the filter parameters include at least one of gain, frequency, timbre, spatial accuracy, or resonance.

16. A non-transitory, computer-readable storage medium having instructions stored thereon, that when executed by at least one processor of a computing device, cause the at least one processor to perform operations, comprising:

panning one or more audio streams of one or more sound sources to a set of virtual loudspeakers at respective virtual loudspeaker locations to yield a set of virtual loudspeaker audio streams, wherein each of the one or more sound sources is assigned to a different virtual source location in a virtual environment;

selecting a filtering mode among a predefined set of filtering modes based on a processing capability of the computing device;

determining, based on a relative position of each virtual source location to a virtual listener location in the virtual environment, filter parameters for a set of audio filters corresponding to the selected filtering mode;

performing a binaural audio filtering process on the set of virtual loudspeaker audio streams, using the set of audio filters and the determined filter parameters, to yield a set of individual binaural audio streams, based on relative positions of respective virtual loudspeaker locations to the virtual listener location; and generating a binaural audio stream by combining one or more of the set of individual binaural audio streams, wherein the binaural audio stream is configured to enable a listener at the virtual listener location to perceive a sound from the one or more sound sources as emanating from respective virtual source locations.

17. The computer-readable storage medium of claim 16, the operations further comprising: adjusting a panning gain of one of the set of virtual loudspeaker audio streams to implement virtual movement of one sound source corresponding to the one of the set of virtual loudspeaker audio streams.

18. The computer-readable storage medium of claim 16, wherein the selected filtering mode is a virtual panning filtering mode, wherein performing the binaural audio filtering process further comprises:

using the virtual panning filtering mode specifying a pair of head-related transfer function (HRTF) filters for each virtual loudspeaker location.

19. The computer-readable storage medium of claim 18, wherein determining the filter parameters further comprises:

determining, based on the relative positions of the respective virtual loudspeaker locations to the virtual listener location, filter parameters for the HRTF filters corresponding to the virtual panning filtering mode.

20. The computer-readable storage medium of claim 18, wherein the pair of HRFT filters are modelled using an infinite impulse response (IIR) to form a pair of IIR HRTF filters.

21. The computer-readable storage medium of claim 16, wherein the filter parameters include at least one of gain, frequency, timbre, spatial accuracy, or resonance.

* * * * *